United States Patent [19]

Mouwen

[11] 4,046,696
[45] Sept. 6, 1977

[54] EXTRACORPOREAL CIRCUIT BLOOD FILTER

[75] Inventor: Herman Charles Mouwen, Ventura, Calif.

[73] Assignees: Johnson & Johnson, New Brunswick, N.J.; Purolator, Inc., Del.

[21] Appl. No.: 615,854

[22] Filed: Sept. 23, 1975

Related U.S. Application Data

[63] Continuation-in-part of Ser. No. 462,455, April 19, 1974, abandoned.

[51] Int. Cl.² ............................................. B01D 35/02
[52] U.S. Cl. .............................. 210/431; 210/DIG. 23
[58] Field of Search .......... 210/90, 130, 135, 429–431, 210/DIG. 23

[56] References Cited

U.S. PATENT DOCUMENTS

| | | | |
|---|---|---|---|
| 935,113 | 9/1909 | Judge | 210/430 |
| 2,143,655 | 1/1939 | Heller | 210/429 X |
| 3,545,616 | 12/1970 | Aspinwall et al. | 210/130 X |
| 3,618,776 | 11/1971 | Kudlaty | 210/130 |
| 3,701,433 | 10/1972 | Krakauer et al. | 210/436 |

Primary Examiner—Frank A. Spear, Jr.
Assistant Examiner—Richard W. Burks

[57] ABSTRACT

An improved extracorporeal circuit blood filter of the type using filter media in the form of a cartridge wherein the improvement comprises an internal bypass directly through the cartridge. The bypass is actuated should the filter media become blocked.

1 Claim, 4 Drawing Figures

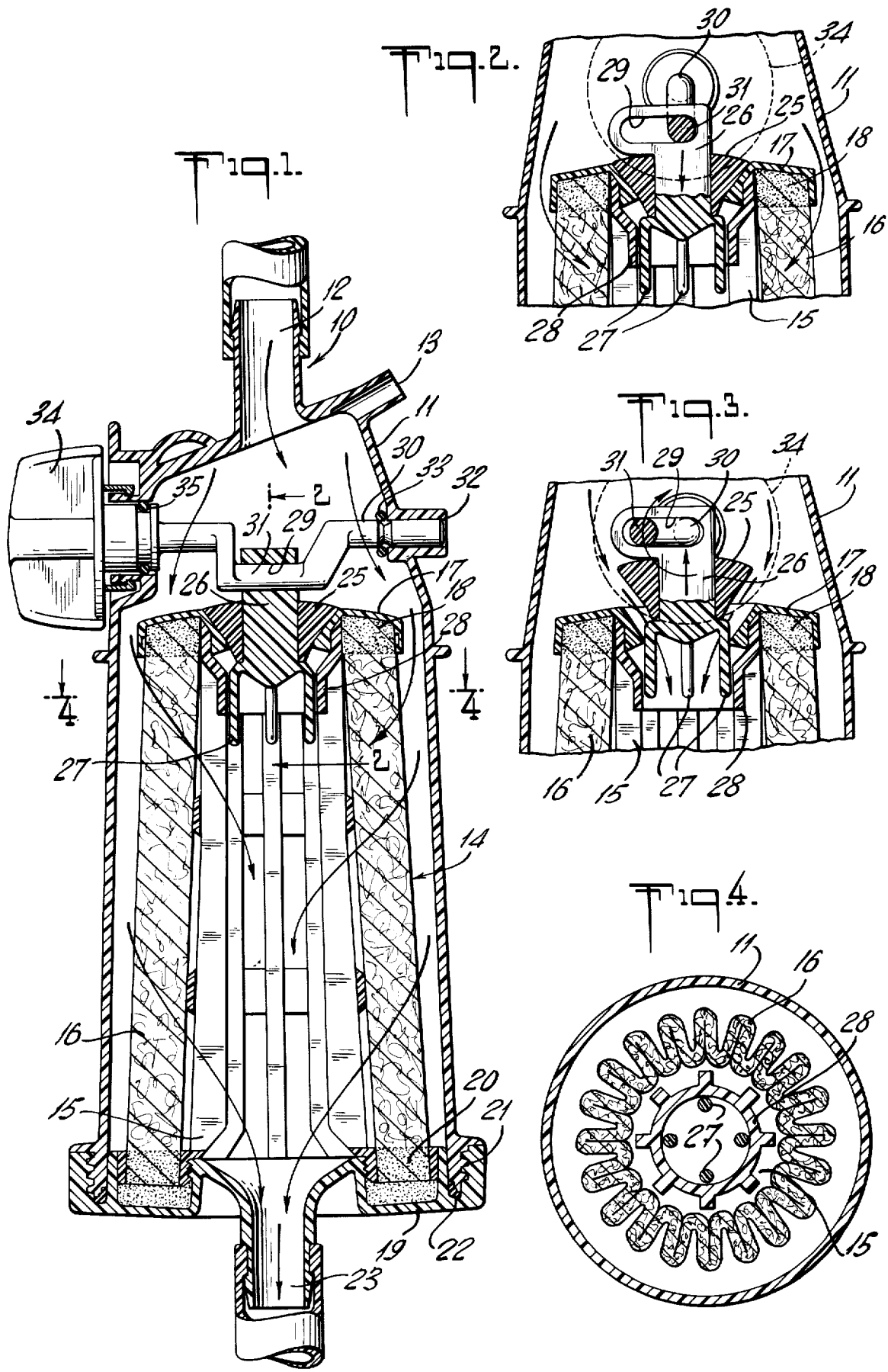

EXTRACORPOREAL CIRCUIT BLOOD FILTER

BACKGROUND OF THE INVENTION

This is a continuation-in-part application of my co-pending application Ser. No. 462,455 filed Apr. 19, 1974 and now abandoned.

Extracorporeal blood circuits are used in open heart surgery. The extracorporeal blood circuit is the circulation of the blood outside the body. Broadly the circuit comprises a venous line and cardiotomy suction line from which blood is directed to an oxygenator for gas exchange The oxygenated blood is pumped through a heat exchanger to regulate temperature, passed through a filter to remove debris or undesirable material from the blood and aid in the degasification of the blood. The filtered blood is returned to the patient through an arterial line. When using a blood filter in the arterial line there is a bypass around the filter which can be readily opened in the event that the filter blocks. Commonly the bypass is a line which extends from the filter inlet line outside the filter to the filter outlet line. The bypass line is clamped off under normal use of the extracorporeal circuit but should the filter become blocked the clamp may be removed and the bypass opened so that the blood flow continues.

There are a number of problems which may be encountered when using an external bypass line in the extracorporeal circuit. The bypass line is filled with blood during the use of the extrcorporeal circuit and the blood may sit there for an hour or more without movement or flow. Because of this the blood in the line may cool to room temperature and should the bypass line be required the cool blood may cause a shock to the patient. Also, during the use of the extracorporeal circuit anticoagulants such as heparin, may be added to the blood to reduce the possibility of clotting. When external bypasses are used the anticoagulants have little or no effect on the blood sitting in the hardware of the bypass line. As a result this stagnant blood is more apt to clot and cause problems should the external bypass be opened.

In some instances the bypass may include a second filter placed in parallel with the filter in use in order to eliminate the latter problem mentioned above. The use of the second filter, however, does not eliminate the temperature problem.

Extracorporeal blood circuits may also be used in other medical treatments such as dialysis.

SUMMARY OF THE INVENTION

I have discovered an improved extracorporeal circuit blood filter which has an internal bypass and eliminates the possibility of blood at a different temperature flowing to the patient should the filter be bypassed. In my new improved extracorporeal circuit bypass there is no requirement that blood be stored in the bypass during circulation of blood and all blood is treated by added anticoagulants or other materials. Also, should the filter media become partially blocked only a portion of the blood flow may be bypassed while the remainder of the blood flow may still be filtered.

In accordance with the present invention I have discovered an improved extracorporeal circuit blood filter with an internal bypass directly through the filter media itself.

A preferred embodiment of the improved extracorporeal circuit blood filter of the present invention is the type of filter which incorporates the filter media in the form of a hollow cylindrical cartridge. One end of the hollow cartridge is sealed with a member and the other end left open. The cartridge is placed in a housing and blood flows into the housing through the media and out the open end of the hollow cartridge. In my improved filter a leakproof valve is situated substantially in the center of the sealing member at the sealed end of the cartridge. The valve is operable and readily opened should the filter media in the cartridge become blocked. When the valve is opened the blood flows directly through the hollow central core of the cartridge bypassing the filter media. In use when the valve is in a closed position, the center core of the cartridge is filled with filtered blood that is continually flowing to the patient and there is no requirement that blood be stored or held in place in order to utilize our bypass.

The internal bypass described above has an added advantage in that it may be opened while priming the filter. By opening the bypass the filter may be readily filled with blood and the air removed eliminating the necessity of inverting the filter or handling the filter in order to adequately prime the filter prior to filtration.

BRIEF DESCRIPTION OF THE DRAWINGS

The present invention will be more fully described when taken in conjunction with the accompanying drawings wherein:

FIG. 1 is a cross-sectional view of an improved extracorporeal circuit blood filter of the present invention, FIG. 2 is a cross-sectional view at line 2 of FIG. 1 showing the bypass valve in the closed position, FIG. 3 is a cross-sectional view at line 2 of FIG. 1 showing the bypass valve in the open position, and FIG. 4 is cross-sectional view taken along line 4—4 of FIG. 1.

DETAILED DESCRIPTION OF THE INVENTION

Referring to the drawings, in FIG. 1 there is shown an improved extracorporeal circuit blood filter 10 in accordance with the present invention. The filter comprises an outside housing 11 with the housng having a center inlet 12 and an air vent 13 at the uppermost part of the housing. The air vent allows gas or air entrapped in the blood to escape. Within the housing there is a hollow cylindrical filter cartridge 14. The cartridge has a hollow center core 15 which is permeable. The media 16 is positioned around the entire periphery of the core. In this particular embodiment the media is shown in a convoluted form. The top of the cylindrical core and the media are encased in an end cap 17. The media is sealed to the end cap by a hot melt adhesive 18. The bottom of the media and the bottom of the core sit in a bottom member 19 and the media is sealed to the bottom member by hot melt adhesive 20. The bottom member is attached to the housing by threads 21 and sealed with a gasket 22 as shown. Other methods of securing the housing and bottom member together as are well known in the art may also be used. Positioned in the center of the bottom member is the blood outlet 23 which connects to the hollow cylindrical core.

Positioned in the center of the end cap 17 which seals the media 16 and the cylindrical core 15 is valve 25. The valve is conical in shape and is seated in the end cap to provide a tight seal. The valve is mounted on a guide member 26. The bottom of the guide member has a plurality of legs 27 which slideably fit into recesses 28 in the center core. At the top of the guide there is an elongated opening 29, more clearly seen in FIG. 2. A shaft 30 having a portion 31 of the shaft offset passes through the opening with the offset portion in the opening. The shaft is mounted for partial rotation in the housing. One end of the shaft is mounted in opening 32 in the housing. The shaft and opening are sealed by gasket 33. The opposite end of the shaft is attached to the turning device 34 mounted in the housing. This end of the shaft is also sealed with a gasket 35.

It should be pointed out that in handling blood it is extremely important that the blood be handled as delicately as possible to avoid deterioration of the blood. This includes that the surfaces and hardware over which the blood passes should be kept to a minimum and be as smooth as possible. As shown in the figures in my preferred embodiment of my new extracorporeal circuit blood filter the shaft itself is offset in its center portion, that is, a portion of the shaft is disposed from the major axis of the shaft. This offset portion of the shaft directly produces the cam action which opens and closes the valve. This offset shaft portion eliminates the need for some type of additional member attached to the shaft to produce the cam action and hence reduces the required hardware in the blood flow path.

As shown in FIG. 2 when the offset in the shaft is in its lowest position the vlave 25 is down and seated in the end cap 17 to seal the end cap of the filter. In this position blood flowing into the filter passes down over the end cap and into the annular area between the filter media and the walls of the housing as indicated by the arrows in FIG. 1 and FIG. 2. The blood passes through the filter media into the hollow center core and downwardly out through the bottom outlet.

As shown in FIG. 3 if the filter media becomes blocked the turning device 34 is rotated 90° turning the offset portion of the shaft in a 90° upward arc and opening the valve 25. When the valve is in the open position blood coming from the inlet is allowed to pass directly to the hollow core and out the bottom outlet.

The valve itself should be positioned in such a manner that if debris and particles collect on the surface of the valve, when the valve is opened, this undesirable matter does not automatically enter the blood flow path.

FIG. 4 is a cross-sectional view of FIG. 1 and shows the relationship of the guide legs 27 at the bottom of the valve to the recesses 28 in the core 15. The legs are allowed to slide in the recesses to aid in guiding the valve in its upward and downward movement.

When my new filter is in use the blood on both sides of the bypass valve is continually flowing and no storage of blood is required for the bypass. As a result there is no change in temperature of the blood and no debris is allowed to build up in the blood. When the bypass is opened blood is still allowed to flow through any portion of the filter media that is not blocked and the patient is only given that amount of unfiltered blood required to maintain a constant flow rate.

The valve should be disposed in such a manner that as the pressure drop across the media increases the valve seal is made tighter or at best doesn't loosen and allow leakage through the bypass. The valve should be openable and closeable manually or if automatically the opening and closing should be governed by blood flow rate and preferably not pressure drop.

It should be noted that there are different types of mechanical designs for the valve itself and the mechanism or manner in which it is actuated; such as direct lift mechanisms, gate valves, ball valves, butterfly valves and the like. Various types of manual or automated mechanisms may be used to control to opening and closing of the bypass. If desired the opening and closing of the bypass may be automatically controlled by variations in the pressure drop across the filter and/or variations in flow rate through the filter.

The housing, center core, end cap and bottom member may be made from any of the materials well known in the art which do not have a detrimental effect on blood and can be easily sterilized. Examples of such materials are the polyolefins such as polyethylene and polypropylene, polycarbonates, butadiene-styrene resins and the like. The guide parts of the valve and the actuating mechanism may be made of the same or similar materials and the portion of the valve contacting the end cap may be made from rubber or like materials which will provide a good seal in the end cap.

Any of the well known filter media used for filtering blood may be used. Examples of such media are the precision woven polyester fabrics or nylon fabrics, the needle punched synthetic fiber batts, felts, foams or other suitable materials. The filter media may be wrapped about the core or it may be convoluted; that is, placed in a fluted form in a cylindrical manner and slid over the core. If desired the media may be in the form of layers or a thick batt of filtering material disposed about the bypass.

It will be apparent that other variations and modifications may be made to the present invention without departing from the spirit and scope thereof. The invention is not intended to be limited except as indicated in the appended claims.

What is claimed is:

1. An extracorporeal blood filter comprising an assembly for supporting a cartridge filter media in a housing fixedly securable to said assembly, said housing having an inlet in the top portion thereof for receiving unfiltered blood, said assembly for supporting the filter cartridge comprising a bottom member attached to the bottom of said housing, said bottom member having a blood outlet located substantially in the center of said bottom member, a hollow, permeable, cylindrical core extending upwardly within the housing from said bottom member to a top cap, filter media contained within the housing and extending from the top cap to the bottom member and about the periphery of the core, said top cap having an opening substantially in the center of said top cap, a valve member seated in said opening, a rotatable shaft mounted in the housing, a portion of said shaft being offset from the major axis of the shaft, said offset portion being connected to the valve member, and means for rotating the shaft whereby the valve member is lifter upwardly and away from the opening in the top cap and blood is allowed to flow directly through the hollow core to the blood outlet.

* * * * *